Aug. 28, 1945.   P. V. PALMQUIST   2,383,884
COLORED REFLEX LIGHT REFLECTOR
Filed June 12, 1944
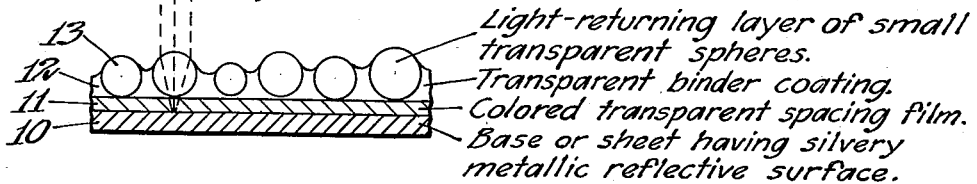
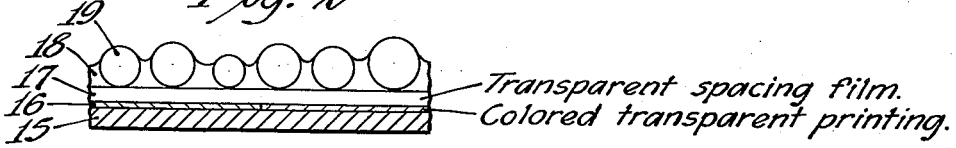
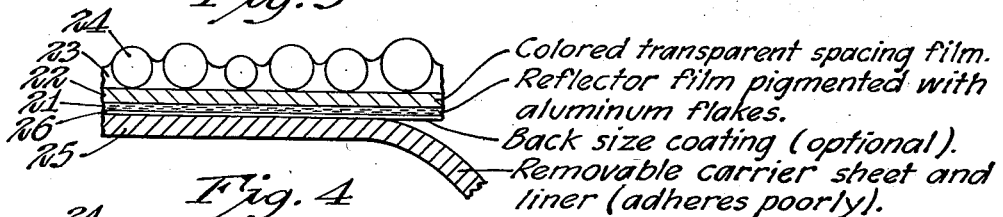
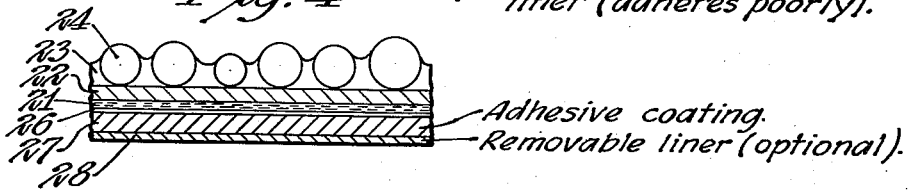
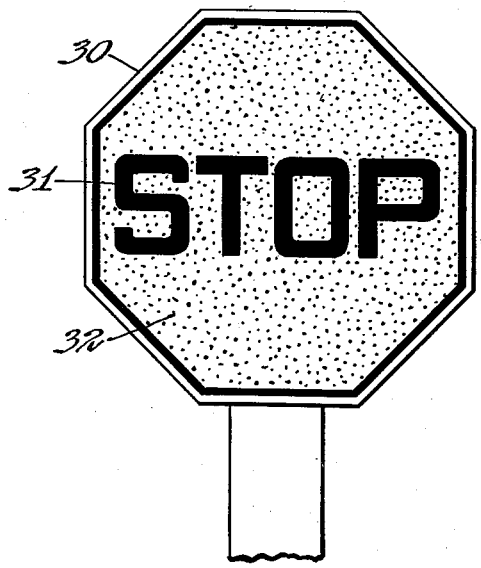
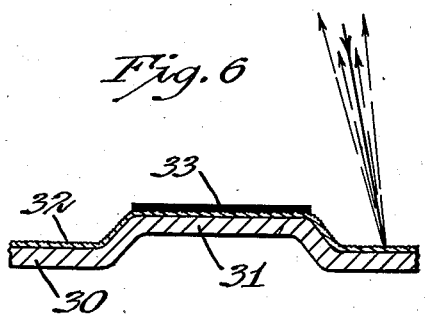
INVENTOR.
Philip V. Palmquist
BY
Carpenter, Abbott, Coulter & Kinney
ATTORNEYS Patented Aug. 28, 1945

2,383,884

UNITED STATES PATENT OFFICE 2,383,884

COLORED REFLEX LIGHT REFLECTOR

Philip V. Palmquist, New Canada Township, Ramsey County, Minn., assignor to Minnesota Mining & Manufacturing Company, St. Paul, Minn., a corporation of Delaware Application June 12, 1944, Serial No. 539,918

11 Claims. (Cl. 88—82)

This invention relates to colored reflex light reflector sheets and signs wherein a light-returning layer of contiguous small transparent spheres (beads) overlies and is spaced from a metallic reflecting surface having a specular or semi-specular "silvery" characteristic. The transparent spheres are uncolored, such as are made from clear transparent glass. Between the spheres and the underlying reflector surface there is an interposed layer or stratum of a transparent film material which is colored so as to constitute a colored light filter, and which may also serve as a spacer to hold the spheres in the desired spaced position. This transparent color layer eliminates the "silvery" appearance and produces the desired colored appearance, such as red, yellow, green, etc. This color layer may be formed by multi-color printing so as to provide the insignia of a sign.

This application is a continuation-in-part of my copending applications Ser. No. 351,168, filed August 3, 1940, and Ser. No. 518,846, filed January 19, 1944 (since issued as Patents Nos. 2,354,048 and 2,354,049, respectively, on July 18, 1944).

An incident beam or ray of light striking the reflex reflector is refracted by the spheres, and reflected by the underlying reflecting surface, in such manner that a brilliant cone of light is selectively returned toward the source, even though the incident light strikes at an angle (see Fig. 6). Road signs and markers of this reflex type have greater visibility at night than do ordinary signs, to the occupants of approaching vehicles, because less of the reflected light is dissipated outside the field of viewing; the reflected light being concentrated in a narrow cone which is substantially coaxial with the incident beam of light coming from the headlights of the vehicle, and hence the occupants of the vehicle are located within the cone of intense reflected light. This reflex reflecting characteristic, which is so important for night viewing, does not interfere with the daytime visibility of the sign when viewed by diffused sunlight. A more detailed discussion of the general optical principles has been given in my Patent No. 2,294,930 (issued September 8, 1942).

The present invention relates particularly to providing reflex reflector sheets and signs which have a colored appearance. Coloration of the glass bead type of reflex reflector has been obtained in the past by using colored spheres. This expedient has numerous disadvantages, including the difficulty of obtaining colored glass in the variety of desired colors, to provide colored transparent glass beads which will not change color when exposed outdoors to the elements and the rays of the sun; and it is necessary to maintain stocks of differently colored beads in order to be prepared to make up sheets or signs of different colors. If two or more areas of different color are to be provided on a single reflective base sheet, it is necessary to apply the beads of different color in separate operations. Another expedient is to apply a transparent colored coating over the layer of beads, but if this is made thick enough to provide adequate intensity of color it will interfere with the desired refractive action of the beads, and in addition the exposure of such a coating to the elements and the sun's rays may result in deterioration. Another expedient is to employ an underlying pigmented reflector, the use of colored pigment providing the color effect. This results in a substantial loss of light intensity due to the absorptive and diffusing nature of colored pigment reflective surfaces, and the color effect is quite different from that produced by the present invention.

The present invention provides colored reflex reflection by employing an underlying "silvery" metallic reflector surface in combination with an interposed colored transparent layer or stratum, located between the layer of uncolored transparent beads and said silvery reflector surface. The reflector surface may be provided, for example, by a metal film such as a plating of silver, aluminum or tin, or a foil of aluminum or tin; or by a stiff metal sheet having a polished reflective surface such as a sheet of aluminum, stainless steel or chromium plated metal; or by a coating containing aluminum flake pigment which lies approximately flat at the surface. Such a reflector surface has a specular (mirror) or semi-specular reflectance characteristic, which makes for very brilliant or intense reflex reflection. A "silvery" appearance would be produced, and a noticeable glare, if the interposed transparent layer were uncolored. The use of an interposed transparent color layer eliminates the silvery appearance and reduces any glare effect, and results in an unusual color effect. There is the further feature that the interposed transparent color layer, especially as to the portions directly underlying the individual beads, is protected from the action of outdoor elements by the overlying layer of beads. A wide variety of different color effects can be readily produced.

The color effect produced in road signs by use of the present invention is unusual as compared not only to ordinary signs but to prior types of beaded colored reflex reflector signs. When viewed at night by the occupants of approaching vehicles, the colored areas of the present type of road signs stand out with great intensity and have a brilliant coloration which demands attention. The color has a "live" quality and the effect is so striking and unusual that it has to be seen in order to be appreciated. Signs made this way are visible at great distances. These results are not obtained at the sacrifice of day appearance when viewed by sunlight.

Whether such signs be viewed from a long distance or close up, there is the feature that the colored areas appear continuous and solid, as though a brilliant paint had been used. This is due to the fact that refraction is produced by a layer of small spheres, there being at least several hundred per square inch, with the number substantially exceeding 10,000 when spheres of less than 10 mils average diameter are employed, so that the human eye cannot resolve the rays from individual spheres even at close range, and also a relatively flat or smooth surface is produced. However these small spheres, in combination with the "silvery" underlying reflector surface and the interposed transparent color layer, produce a "live" appearance, which is lacking in ordinary signs (quite apart from the factor of improved visibility).

Signs made in this way have a day and night appearance which is totally unlike that of signs made by mounting so-called reflector "buttons" on a sign base. Even though colored reflector "buttons" should be used, having an equivalent optical structure, the relatively large size of such buttons, and of the intervening spaces, renders them individually visible both by day and by night. The result is that when an area of contiguously mounted "buttons" is viewed there is a consciousness of viewing an aggregation of such "buttons," rather than a continuous area. The use of colored reflector "buttons," mounted contiguously over substantial sign areas, would be quite expensive, and such buttons are usually only employed along the margins of areas for outlining purposes. A further disadvantage is that they are subject to vandalism and breakage. The "button" reflector units cannot of course be employed in making signs by printing and painting techniques, which is an important feature of the present invention. Signs made with reflector "buttons" are therefore in an entirely different category and in no sense equivalent to signs made in accordance with the present invention.

Colored reflex reflector sheets and signs of the present type may be made up in a variety of ways, as will hereinafter be illustrated. Signs may be made up in which the colored areas (such as letters, symbols and backgrounds) are formed by painting or printing or screen processing on a single reflective base, using transparent colored coatings, followed by applying a transparent beaded layer thereover in any of several possible ways.

Colored reflex reflector sheet material may be manufactured in continuous web fashion in any reasonable width and length and may be supplied to sign makers in roll form, to be cut to desired shapes and applied to desired bases in making up signs. Sheets of different colors may be used to provide areas of different colors. Such reflector sheeting may be made with sufficient stretchiness so that it can be readily conformed to irregular surfaces, as for example to the surface of an embossed metal sign base. The reflector sheet may be fastened to desired base surfaces in various ways. Thus it may be tacked, stapled or riveted, or may be bonded by an adhesive or cement. It may be provided with an initial integral adhesive coating on the back so as to be in ready-to-lay form.

Waterproof and weatherproof sheets and signs can be made which are highly suited to outdoor use, remaining effective for at least a year of continuous outdoor exposure to sunlight, rain, snow and extremes of temperature.

Various objects and features of the invention will additionally be apparent from the following description of illustrative embodiments.

In the accompanying drawing:

Figs. 1, 2, 3 and 4 are schematic diagrams indicating in magnified fashion the structures of illustrative colored reflex light reflector sheets and signs made in accordance with this invention;

Fig. 5 is a plan view of a highway "stop sign" having embossed (raised) lettering, over the whole surface of which a stretchy colored reflex light-reflector sheet has been applied to provide improved night visibility, the beaded surface of the sheet being covered with black ink or paint in the raised letter areas to provide black lettering as in an ordinary sign, and the remaining areas providing a contrasting colored background (such as yellow or red) both by day and by night to attract attention to the sign and to make the lettering stand out more plainly; and Fig. 6 is a diagrammatic sectional view taken through one of the raised letter portions of Fig. 5, and the right hand portion illustrates the concentrated cone of reflex reflected colored light returning toward the source of an angularly incident ray or beam of light.

Referring to Fig. 1, there is shown a diagram illustrating in highly magnified fashion the sectional structure of a type of the product. The diagram is not a literal section view, since the spheres are spaced farther apart than is customary; and each circle represents a full circumference, which would not be the case in a true section as the spheres are not actually arranged in rows but are packed so that a section plane could not be passed through the centers of a series of adjacent spheres. This colored reflex light reflector sheet or sign structure has a reflective base or sheet 10 having a silvery metallic reflective surface characterized by a specular or semi-specular reflectance characteristic. The diagram broadly applies no matter what the particular reflector may be. Thus the reflector surface may be provided by a metal sheet having a silvery reflective surface such as a sheet of aluminum, stainless steel or chromium plated metal; by a foil of aluminum or tin (which may or may not be laminated to a support); by a plating of silver, tin or aluminum; or by a flexible sheet (such as waterproofed paper) or a rigid base (such as metal or wood) coated with an aluminum paint containing aluminum flakes which lie approximately flat at the surface. The silvery specular or semi-specular reflective nature of the surface is of great importance, and is to be distinguished from ordinary reflective painted surfaces or coatings which have a non-specular or diffusing reflectance characteristic and which are either colored or white. The reflectance characteristic employed in the present product is one of the essential factors in producing the desired result.

Overlying and bonded to said silvery reflective surface is the colored transparent spacing film 11, which may either be a laminated precast film or may be a film which is cast or formed in situ as a coating. The coloration of the film may be produced by use of a dye, or by inclusion of a transparent colored pigment having substantially the same refractive index as the film material so as to avoid appreciable scattering of light rays passing through the film. This colored transparent film acts as a light filter and also serves as a spacing film. A transparent binder coating 12 overlies and is bonded to the colored spacing film. This binder coating may also be colored, but it is generally preferable to employ a clear, uncolored coating. When the binder coating is colored, it may have a different color than the color of the spacing film, in order to produce a day appearance which is different than the night appearance, and to cause a change in the color appearance at night as the sign is approached owing to the change in the angle of incidence of the light from the head lamps of the vehicle. It will be understood that the invention is not limited to use of transparent binder coatings. An opaque binder coating (black, white or colored) can be used, provided that the inner extremities of the spheres are not covered over and are in optical communication with the underlying spacing film. A light-returning layer of small transparent spheres 13, which are clear and uncolored, is partially embedded in the binder coating so as to provide a multiplicity of contiguous convex lens elements, the inner extremities touching or closely approaching the outer surface of the underlying colored spacing film and being in optical communication therewith. The binder coating holds the spheres firmly in place.

The transparent spheres may be made of any suitably hard, clear, transparent solid material, such as quartz, ordinary inorganic glass, or a suitable so-called organic glass (such as a hard polymer of methyl methacrylate). Small spheres are employed to provide several hundred, at least, per square inch. It is preferred to use spheres having an average diameter not exceeding about 10 mils; and excellent results are obtained with spheres having an average diameter in the range of about 3 to 6 mils, in which case there will be upwards of 10,000 per square inch; thus providing a relatively smooth surface which can be readily printed or painted, if desired, and which appears continuous. The use of small spheres makes possible the production of reflex reflector sheets which are thin and pliant, and aids in making stretchy sheets. In a batch of small spheres, even after screen grading, there will be some variation in size as between individual spheres, which preferably should be held within limits so that most of the spheres will not vary from the average diameter by more than 50%.

An incident beam of paraxial light rays (illustrated by (a) in Fig. 1) will be refracted in passing into a sphere and will converge, coming to approximate focus behind the sphere when it is of glass having an ordinary index of refraction. Assuming that substantially no refraction occurs at the rear surface of the sphere, as is true when the refractive indices of the spheres, binder coating, and spacing film are substantially the same, the convergent rays will pass through and beyond the sphere without substantial further bending and will strike the underlying reflector 10. The reflector will then emit a divergent cone of light rays which will pass out through the sphere, and upon emerging will be refracted so as to reduce the angle which the rays make with the optic axis, and will return toward the original source of light as a concentrated cone. The returned light is colored due to the differential color filtering action of the colored transparent spacing film. The degree of divergency of the rays returning toward the source from the outer sphere surface is dependent on the nature of the reflector, the refractive index of the sphere, and the thickness of the spacing film. Optimum brilliancy of reflex reflection, as viewed by an observer located near the axis of the incident light beam, is secured by an optical structure which reduces to a minimum the degree of divergency of the returning rays, so as to minimize wasting light outside the viewing zone. This is accomplished by having the incident rays strike the reflector surface when most nearly in focus and by employing a specular or semi-specular reflective surface. A perfect focus is impossible due to the optical spherical aberration effect, even if the sphere were perfectly round, but a spacing distance can be chosen to secure the optimum of possible brilliancy. In the case of a sphere of ordinary glass, having a refractive index of about 1.50–1.55, the optimum distance for spacing the inner extremity from the reflector, is about one-third the diameter of the sphere. The optimum spacing distance decreases with increase of refractive index of the sphere until it becomes zero (no spacing) at an index of approximately 1.85–1.90. Over-spacing not only causes a loss of brilliancy but a poorer angularity characteristic. Under-spacing causes a loss of brilliancy as regards an observer close to the axis of incident light which strikes the reflector at a small angle to the normal, but produces greater angularity and divergency and hence may be desirable when an increase in these characteristics is desired.

When a layer of spheres is spaced from the reflector surface by a transparent spacing layer of uniform thickness, so that the inner extremities of the spheres are an equal absolute distance from the reflector, and the spheres differ from each other in diameter, the spacing ratio will differ as between spheres of differing diameter. The average spacing ratio in such case may be computed by dividing the spacing layer thickness by the average diameter of the sphere. Some individual spheres will then be spaced a greater distance than others, having reference to the ratio value; those of larger than average diameter being under-spaced and those of smaller diameter being over-spaced. Hence an average spacing ratio is preferable which is slightly less than the value which would be used if all the spheres had the same diameter, so as to insure that fewer individual spheres are over-spaced (under-spacing being preferable to over-spacing). However, useful results can be obtained even though there is a departure from the optimum or most desirable value. In the case of ordinary glass spheres (refractive index about 1.50–1.55), a spacing distance within the range of about 20–40% of the average diameter gives best results for most purposes. In commercial manufacturing practice, the optical consequences of variations in spacing can be readily observed so as to provide a guide to making adjustments to secure the desired result.

When the transparent spacing film located between the spheres and the reflective surface has a refractive index substantially different than that of the spheres, the optimum spacing distance will be different on that account, owing to the substantial refraction or light-bending which will take place at the inner surfaces of the spheres. The optimum spacing distance will be decreased or increased if the spacing film has a refractive index less or greater, respectively, than that of the spheres.

In connection with the influence of spacing on optical properties, it should be clearly understood that it is not the absolute distance which is determinative, but the ratio of the spacing distance to the sphere diameter. The same ratio produces the same effect whatever the sphere diameter, and hence the need of spacing to secure optimum brilliancy is not overcome by using small spheres, although the absolute distance is reduced proportionally with a reduction in sphere diameter, but have the same critical effect.

This light-returning phenomenon occurs even when the beam or rays is incident at an angle, whence the designation "reflex." The reason is that some of the rays emitted from the reflector 10 will be within the field of the angular convergent cone which strikes it and will return toward the source along the same path, or close to it, that was followed by the incident rays. A highly specular reflector (such as a plating or highly polished foil) underlying the beads would emit few rays in the right direction to be returned to the source, when the incident light approaches at a substantial angle, and hence would cause poor angularity, but will produce extremely high brilliancy when the angle of incidence is relatively small. A semi-specular reflector, such as is obtained by using metallic reflecting aluminum pigment flakes which lie approximately parallel to the plane of the reflector, gives a useful combination of high brilliancy coupled with a good enough angularity such that the actual observed brilliancy is substantially greater than for non-specular reflectors up to fairly large angles (about 30°). These factors, including the regulation of the spacing distance, allow of considerable scope in design so as to obtain a reflex reflector best suited to a particular requirement. For reflex reflector sheets to be used in making vertical highway signs located beside the highway and at approximately right angles to it, maximum distance visibility at night by reflex reflection is obtained by using a spacing distance which gives maximum brilliancy for small angles of incidence as viewed by an observer located close to the axis of incident light, and this spacing distance is in the range of approximately 20–40% of the average sphere diameter when spheres are used having a refractive index of approximately 1.50–1.55.

The Fig. 1 structure, as shown and above described, involves a binder coating distinct from the spacing film. The same type of optical structure can be secured by employing a single transparent colored binder coating of sufficient total thickness to serve both functions. Control of spacing of the spheres away from the reflector surface is then somewhat more difficult, but can be accomplished by using a binder coating composition of such viscosity and surface tension that the small spheres, when sprinkled thereover, will sink in to the desired extent and no more, followed by setting-up the binder to its final state.

Fig. 2 shows a modification of the Fig. 1 structure wherein the total transparent stratum between the layer of spheres and the reflector surface is comprised of a transparent uncolored film beneath the spheres and an underlying thin colored transparent printing coating located over the reflector surface.

The base or sheet 15 has a silvery metallic reflective surface of the specular or semi-specular type (such as any of the kinds previously mentioned in connection with the reflector base or sheet 10 of Fig. 1). Overlying and bonded to said reflective surface is a thin transparent printing coating 16, and overlying and bonded thereto is an uncolored transparent spacing film 17. This in turn is covered by an uncolored transparent binder coating 18 in which a layer of small uncolored transparent spheres 19 is partially embedded, the inner extremities of the spheres touching or closely approaching the outer surface of the spacing film.

The thickness of the printing coating is ordinarily much smaller than the thickness of the overlying uncolored transparent spacing film, so that the latter has substantially the same thickness as the colored spacing film of the Fig. 1 construction and hence has approximately the same mechanical strength. The colored transparent printing coating may have the same color over the whole area; or it may have different colors in different areas so as to provide desired sign indicia (such as letters, designs, backgrounds, etc.), which is indicated in Fig. 2 by the left and right hand parts of printing 16, illustrating the juncture of printing areas of different color.

The ultimate product can be made up by various methods. Thus the reflective base or sheet 15 can be printed prior to application of the overlying transparent spacing film 17. Multicolor sign sheeting can readily be made by printing the reflective sheet on a multi-color offset press. Signs can also be made by painting the reflective base, or by using screen process methods, employing suitable transparent colored inks or paints. The colored transparent printing can then be coated with an uncolored transparent coating composition adapted to provide the transparent spacing film 17, followed by applying the binder coating and layer of spheres. Another expedient is to separately manufacture a transparent uncolored beaded sheet comprised of a transparent film 17, coated with a transparent binder coating 18, in which the layer of spheres 19 is embedded. This preformed beaded sheet can be laminated to the printed surface to form the desired reflex light reflecting sign. This procedure has the advantage that the uncolored beaded sheeting can be made up and used as a single stock material for making up various signs. A further expedient is to take the uncolored transparent beaded sheeting just described and print on the flat back face thereof to provide the colored transparent printing, afterwards laminating the printed sheet to a base or sheet having a silvery metallic reflective surface (such as, for example, an aluminum foil). In all of these cases the ultimate product has the same essential structure shown in Fig. 2. By using a thermo-adhesive spacing film, or thermo-adhesive printing composition, or both, direct lamination can be obtained by hot-pressing. When an interposed laminating adhesive is used this should be transparent and relatively thin, and its thickness will constitute part of the total spacing thickness between the inner extremities of the spheres and the reflective surface.

Fig. 3 shows a colored self-sustaining flexible beaded reflex reflector sheet of what I term the "backless" type; in contradistinction to beaded sheet material built up on a base or backing underlying the reflector means and relied on as a support for the reflex reflecting structure and constituting an integral or permanent element of the manufactured sheet product, remaining a part of the sheet in its ultimate location and use. The term "backless" does not, however, exclude the provision of a temporary support or liner to which the inherently self-sustaining reflector sheet removably adheres, and from which it can be readily stripped, as when it is to be applied to a desired sign base in making up a sign; nor does it exclude an adhesive layer or coating on the back face so as to provide a ready-to-lay sheet which can be readily adhered or bonded to base surfaces in making up signs. This reflector sheet may be made with sufficient stretchiness so that it can be readily conformed to irregular surfaces, as for example to the surface of an embossed metal sign base, a stretch of at least about 20% being desirable for such uses.

This "backless" type of colored reflector sheet has a back light reflector film 21 (comprised of a binder pigmented with aluminum flakes to provide the desired silvery metallic reflection) which is flexible and, instead of being mounted on a permanent backing, serves itself as the back element of the reflector sheet structure proper. This reflector film provides a semi-specular silvery reflective surface. Overlying and bonded to said reflector film is a flexible transparent colored spacing film 22, which is covered in turn by a transparent binder coating 23 in which a layer of small transparent spheres 24 is partially embedded; this part of the structure thus being the same as that described in connection with Fig. 1 and details need not be repeated.

The foregoing "backless" reflector sheet is shown mounted on an underlying removable carrier sheet 25, which is employed as a casting web in making the "backless" reflector sheet, and which may be left in place as a temporary liner. This carrier sheet adheres poorly and can readily be stripped off when desired. In order to facilitate such removal, the back face of the reflector film may be provided with a thin back size coating 26 of such nature that the carrier sheet adheres poorly. This expedient is desirable in cases where the nature of the reflector film is such that it would adhere too strongly to the surface of the particular carrier sheet employed. The back size coating may also be used to advantage when it is desired to provide a protective covering for the back face of the reflector film. Although it is an integral and permanent element and underlies the reflector film, it is not a backing in any ordinary sense and is not used to perform the function of a backing, being a mere sizing on a sheet which is itself fully self-sustaining in the absence of such a coating.

The reflector sheet can be built up by employing a carrier sheet 25 having a smooth surface, such as a non-fibrous film (illustrated by a cellulose acetate film) or a paper sheet which has been coated with a film-forming composition which results in a flat and smooth surface. On the smooth surface of such carrier sheet there is applied a coating composition which on drying or setting-up results in the thin back size coating 26, and this composition is selected so that the back size coating adheres poorly to the surface of the carrier sheet, so as to permit of ultimate stripping apart, but is capable of firmly bonding to the next applied coating. There is next applied an aluminum pigmented coating composition which anchors to the back size coating and on setting-up provides the reflector film 21. This in turn is coated with a colored transparent composition to provide the colored spacing film 22, over which is formed the transparent binder coating 23 in which the layer of small spheres 24 is partially embedded. Following completion of the reflector sheet, the carrier sheet 25 may be stripped off as a step in the manufacturing operation. However, the carrier sheet may be retained in place to serve as a liner and temporary support for the reflex reflector sheet proper, being removed by the user at the time of making up a sign (as indicated in Fig. 3). This carrier sheet when thus retained will not interfere with the ready cutting of the whole sheet, as during slitting operations in making up rolls or cutting of the sheet to desired sizes or shapes. The back size coating may be omitted and the reflector film cast directly on the surface of the carrier sheet when the reflector coating composition is so chosen, with respect to the surface character of the carrier sheet, as to cause low adhesion of the reflector film which will allow of ultimate stripping off. Illustrations of production methods are set forth in more detail hereinafter in Examples 1 and 2.

Fig. 4 shows a ready-to-lay type of "backless" colored reflex reflector sheet. Reference numerals 21, 22, 23, 24 and 26 designate the identical "backless" reflector sheet shown in Fig. 3, the carrier sheet 25 having been stripped off. An adhesive coating 27 is bonded to the back face of the reflector sheet; and, if desired, a temporary removable liner 28 may be applied to the exposed back face of the adhesive coating as a protection and to separate the adhesive coating from the surface of the layer of spheres if the sheeting is wound in rolls. The adhesive should be waterproof for use in making outdoor markers or signs, and may be of a normally non-tacky kind, which is activated to a tacky state by use of a solvent, or heat, or both; or it may be a normally tacky (pressure-sensitive) type. The removable liner may be, for example, a sheet of straight (non-moisture-proofed) "Cellophane" (regenerated cellulose film), which can be readily removed by moistening with water and peeling off.

Figs. 5 and 6 show a highway "stop sign" illustrating a use of the colored reflex reflector sheet of the "backless" type described in connection with Figs. 3 and 4. The sign base is a regular embossed metal sheet 30, the lettering being raised above the background by embossing, as illustrated by the sectional view of a portion of a letter 31 shown in Fig. 6. Over the whole surface area of the base there is applied and bonded a stretchy "backless" reflex reflector sheet 32, having the type of structure previously described in connection with Figs. 3 and 4; the removable carrier sheet or liner being of course removed in advance of application if present. The reflector sheet should be of the stretchy "dead-stretch" type so that it can be readily pressed to make a snug fit to the irregular surface, a stretch of about 20% or more being most desirable. If a sheet is used which does not have an integral adhesive coating on the back, the sign base may first be coated with an adhesive or cement, the reflector sheet then being applied thereover while the adhesive coating is still tacky. Conformation of the sheet to the surface can readily be made by pressing down the laminated sheet by means of a soft roller. If any air pockets are formed under the reflector sheet, or any buckles result, they can be removed by locally pricking through or slitting the sheet and then pressing down to provide smooth contact and conformation to the base surface. The applied sheet can be originally cut to provide margins extending beyond the base area, which can be folded back around the sign edges, or can be trimmed off to provide accurate coverage. A preferred type of adhesive or cement is one of the polymerizing kind which set-ups by polymerizing after being applied. If applied in a solvent vehicle (used to facilitate coating), the sheet is applied after the solvent has evaporated from the adhesive coating in order to prevent the solvent from being trapped. When a ready-to-lay type of sheet is used, having an integral back coating of adhesive (as shown in Fig. 4), it can be applied directly, the adhesive being activated in any suitable way, before or after application of the sheet to the base, depending on the nature of the adhesive. A pressure-sensitive adhesive does not need activation, being normally tacky.

The resultant raised areas of the reflex reflector sheet, which overlie the lettering, can then be blacked out, as by running a roller, coated with black ink or enamel, over the sign so as to cause transfer of the ink or paint to the raised areas. The lettering will then appear black, as in the ordinary highway sign. This is shown in Figs. 5 and 6, the black coating 33 on a particular letter being indicated in Fig. 6. The remaining area of the sheet provides a contrasting colored reflective background, the reflex reflection produced by the background area being indicated by the rays of light indicated in the right hand part of Fig. 6. The background area of "stop signs" is generally yellow. This effect can be obtained by employing a yellow dye or transparent pigment in the transparent spacing film. The background area will appear yellow both by day (when viewed by diffuse daylight) and by night (when viewed by reflex reflection by occupants of approaching vehicles, the head lights providing the incident light and the occupants being near the axis so as to be within the brilliant cone of returning light).

A further advantage of the "backless" film type construction of the reflex reflector sheet, is that it resists vandalism. If a vandal attempts to pry or strip off the reflector sheet from the base to which it is bonded, the film sheet will tear or break locally so that only a very small piece can be removed at a time, making the enterprise so difficult and profitless as to discourage the effort.

The present invention provides a way by which existing embossed traffic signs can be readily and inexpensively converted to signs of the reflex type having a very billiant and live color which demands attention. The stretchy reflex reflector sheeting can be applied to the metal sign base without the need of highly skilled labor or elaborate equipment, as is apparent from the foregoing description. This results in a large saving of cost in replacing conventional signs with signs of the reflex reflecting type, and provides an added inducement to highway and traffic authorities to make the change on an extensive scale. The feasibility of highway safety devices depends not only on technical operativeness but on economic considerations, and hence this factor is of importance to the real usefulness to the public of the present invention. And in this connection it is of importance that the present invention provides a highly weatherproof reflex reflector sheet which can stand several years at least of outdoor exposure without suffering substantial deterioration of efficiency, and which is proof against vandalism. Traffic signs made in accordance with the present invention have such a brilliant and live color that to approaching motorists at night they stand out as though the colored light was being projected through the sign toward the observer, rather than appearing to be reflective signs.

EXAMPLE 1

This example illustrates a method of making colored reflex reflector sheeting of a stretchy and "backless" type adapted to be applied to the surface of an embossed metal sign base. Use is made of a coated paper as a removable carrier sheet on which the reflector sheet is built up by a casting technique, and which can be removed and reused in making further reflector sheeting, or can be left in place as a removable liner which can be stripped off dry whenever desired (as distinguished from liners which must be moistened to be readily removed).

The carrier web is first prepared from a highly calendered hard-surfaced paper (as, for example, a 40 lb. per ream Acme Fourdrinier paper, or a 70 lb. Duracel Fourdrinier paper), by knife-coating one side with the following solution in an amount sufficient to provide a dried coating having a weight of about 10 grains per 24 sq. in. Formula proportions are in parts by weight:

| | Parts |
|---|---|
| Vinyl acetate polymer (such as AYAT type sold by Carbide & Carbon Chemicals Corp.) | 35 |
| Ground mica | 17.5 |
| Denatured ethyl alcohol | 65 |

The coating may be dried by heating at 120–130° F. for half an hour, to evaporate the alcohol solvent. The coating adheres tenaciously to the paper and provides a smooth surface adapted to receive the reflector film coating. This surface coating for the carrier web is chosen with reference to the composition of the reflector film coating so that when the latter is applied in solution form it will have a good wetting action and initial adhesion to the carrier web surface, but will adhere poorly on completion of drying or curing so as to permit of stripping apart when subsequently desired.

The following reflector film coating composition may be used to secure the desired result, being applied over the coated face of the carrier web by knife-coating in amount which will produce an ultimate dried film weighing about 10 grains per 24 sq. in.:

| | Parts |
|---|---|
| Polyvinyl butyral (such as Vinylite XYSG sold by Carbide & Carbon Chemicals Corp.) | 16 |
| Flaked aluminum pigment (such as aluminum lining powder) | 12 |
| Tricresyl phosphate | 8 |
| Denatured ethyl alcohol | 72 |

The reflector film coating may be dried at 120–130° F. for half an hour to evaporate the alcohol solvent. The aluminum flakes will lie approximately flat (parallel to the plane of the sheet) to provide a silvery reflector surface of the metallic semi-specular type. The polyvinyl butyral, plasticized or elasticized by the tricresyl phosphate, provides a waterproof, flexible and stretchy film.

Other polyvinyl aldehyde polymer resins can be used in place of the polyvinyl butyral to provide suitable stretchy films.

The transparent colored spacing film is next formed by knife-coating the reflector film surface with the following composition in amount to produce a dried film of the desired thickness relative to the average diameter of the spheres to be used. Assuming the use of No. 11 beads having a diameter range of approximately 5 to 6 mils, and that a spacing distance of approximately 2 mils is desired, a dried spacing film weight of approximately 20–21 grains per 24 sq. in. is suitable, when formed from the following coating composition:

| | |
|---|---|
| Polyvinyl butyral (such as Vinylite XYSG) | 18 |
| Tricresyl phosphate | 9 |
| Denatured ethyl alcohol | 83 |
| Soluble dye | 0.3–3 |

The resultant spacing coating may be dried for half an hour at 120–130° F. and provides the colored transparent spacing film. This film is integrally bonded to the underlying reflector film and is likewise waterproof, flexible and stretchy. It is sunfast and is not darkened nor deteriorated by the sun's rays on outdoor exposure. The soluble dye should be soluble in the coating resin (in this case polyvinyl butyral) and should be of a light-fast type and insoluble in water. The following are examples of commercially available dyes which may be employed in the above formula: "Dupont Luxol Fast Blue MBS" (made by E. I. du Pont de Nemours & Co.); and "Azosol Fast Red 3BA," "Azosol Fast Yellow GRA" and "SO163 Auramine D. C. Conc." (a yellow dye), made by General Dyestuff Corp. Mixtures of dyes of different color can of course be used to produce various shades of color. The intensity of color can be controlled by varying the proportion of dye.

An uncolored transparent bead binder coating is next applied by knife-coating the following coating composition over the spacing film, a wet weight of 10–13 grains per 24 sq. in. being suitable for holding No. 11 beads or spheres of approximately 5 to 6 mils diameter:

| | |
|---|---|
| Heavy blown castor oil | 100 |
| "Beetle No. 227–8" (50% solids) | 200 |

The "Beetle No. 227–8" is a 50% solution of thermo-setting urea-formaldehyde resin in a volatile solvent composed of 60 parts butyl alcohol and 40 parts xylol, sold by American Cyanamid Co. The blown castor oil serves as a plasticizer.

This composition makes for a binder coating layer which is flexible and stretchy, weatherproof and non-darkening, provides a good bond to inorganic glass beads and integrally bonds to the underlying colored polyvinyl butyral spacing film.

With the binder coating still in a wet or undried state, No. 11 inorganic glass beads or spheres having a refractive index of about 1.53 and a diameter range of about 5 to 6 mils, are applied in excess to form the lenticular light-returning layer, the beads sinking down in the wet coating until they touch, or closely approach, the surface of the colored spacing film. Positioning of the beads can be facilitated by passing the web over a batter. The web may then be passed down around a roller to cause excess beads to fall off.

The web, with its applied coatings, is then festooned on racks and oven cured to set-up the bead binder coating, using a curing time of 50–60 minutes at 212° F. Any surplus beads adhering to the surface can be removed by passing the web around a roller and subjecting the beaded surface to the action of a rotary brush and air blast, or by employing a knife blade spaced just far enough to catch and remove excess beads projecting above the proper layer of beads. The reflex reflector sheet can then be stripped from the coated paper carrier web and the latter can be reused.

The resultant colored "backless" reflex reflector sheet will stand extensive outdoor exposure without substantial deterioration or loss of efficiency. It is quite flexible or pliant and is well adapted to application over the surfaces of embossed sign bases, having a dead-stretch and a high degree of stretchiness. The sheet may be readily cut into pieces or desired shape and size. It can be cut by hand, using a knife or shears, or can be cut mechanically. The glass spheres or beads are firmly bonded and do not loosen and fall out when the sheet is stretched. The following data shows the mechanical properties in a quantitative way, being based on sheets made as described in this example, using No. 11 glass beads (5 to 6 mils diameter).

The "backless" sheet (after removal of the carrier web) had a total caliper thickness of approximately 13 mils, as measured by a machinists micrometer. This represents the maximum thickness, between the back face and the outer extremities of the beads which project farthest, rather than the average thickness as might be calculated from the average bead diameter and thickness of the spacing and reflector films (such average thickness being somewhat under 10 mils). The sheet had a tensile strength of approximately 10 lbs. per inch width and a stretch of 110%.

The strength and stretch values were measured on a regular Model 37–4 electro-hydraulic tensile tester, made by the Thwing-Albert Instrument Company, of Philadelphia, Pa. The jaw opening was 4 inches, the initial length of the test strip subjected to tension thus being 4 inches, and the machine was set to produce jaw separation at the rate of 15 inches per minute. The test strips were cut to an accurate width of one-half inch, and hence the tension value in pounds is multiplied by two to give the tension per inch of width. The machine indicates the tension force and the extent of elongation of the test strip at the time of rupture. A stretch of 110% means that the 4 inch initial length of the strip (between jaws) had increased to 8.4 inches when rupture took place (i. e. the stretch is the increment of length divided by the original length, multiplied by 100 to give the percentage value). The tensile strength is the tension force exerted just prior to rupture.

An alternative procedure which may be employed in making signs is to print the surface of the aluminum flake reflector film prior to applying the transparent spacing film. The web, with the reflector coating formed thereon, may be readily printed on a rotary multi-color offset press, using transparent colored inks to form the lettering, designs, symbols, etc., and the background areas. The inks may have the formulation previously described for the colored transparent spacing film composition, appropriate dyes being used to obtain a variety of colors. The proportion of dye should be greater since the thickness of the printed coatings will be much less than the thickness of the spacing film. Following drying of the printing, the remaining procedure is the same as previously described except that the dye is omitted from the spacing film coating composition. The latter may be applied in a slightly lower coating weight if the thickness of the printing is appreciable. The result in the product is that the transparent printings produce a colored sign having the reflex reflecting properties that have been indicated.

EXAMPLE 2

This example illustrates a variation in making technique and the use of transparent pigments for coloring the spacing film. The same general procedure described in the preceding Example 1 is used, except for the provision of a back size coating to provide a back surface which will adhere poorly to the particular carrier web employed so as to permit ready stripping without moistening (the structure being that shown in Fig. 3).

The paper carrier web is surface coated with a 40% solution of isobutyl methacrylate polymer in xylol, using a coating weight (web) of 13–16 grains per 24 sq. in., and is dried for 15 minutes at 120° F. to evaporate the xylol. This provides the smooth casting surface, adapted to permit ready stripping of the reflector sheet. A back size coating is then applied to the casting surface, using a 10% solution of polyvinyl butyral (such as Vinylite XYNC sold by Carbide & Carbon Chemicals Corp.) in Ethyl Cellosolve (ethyleneglycol monethylether), applied with a wet weight of 20 grains per 24 sq. in., followed by oven drying for one hour at 140° C. This back size coating bonds to the next applied reflector coating, but adheres poorly to the casting surface.

The reflector coating composition is comprised of 100 parts of an oil-modified air-drying phenolic resin base varnish, containing 10 parts of aluminum flakes (such as aluminum lining powder), and is applied in a coating weight of 10 grains per 24 sq. in. The coated web is heated for two hours at 140° F. to thoroughly cure the reflector coating.

The colored transparent spacing film is then cast on the reflector coating, using a wet coating weight of 23–25 grains per 24 sq. in. with the following formulation:

"Beetle No. 227–8" (50% solids) ............ 100
Heavy blown castor oil .................... 50
Transparent pigment .................... 0.5–2

The film is cured for one hour at 200° F. The transparent pigment should be light-fast and have a refractive index approximately equal to that of the cured resin film so as not to cause appreciable scattering of light and loss of transparency. The use of transparent pigments in printing inks is well known and many suitable pigments are available on the market. The following are examples which have proved quite satisfactory in the above formulation:

Lake pigments, such as, for example, Dupont Yellow Lake YP–440–D, and Dupont Alizarine Red Lake RT–332–D.

Phthalocyanine pigments, toners and lakes; which are distinguished from phthalocyanine dyes by lack of solubility and each of which serves as a colored pigment. This class of coloring agents is described in an article in Industrial and Engineering Chemistry, July, 1939, pages 839–847. Examples are the "Monastral" colors sold by E. I. du Pont de Nemours & Co., such as Monastral Fast Blue GS, Monastral Fast Green GS and Monastral Blue Toner BT–172–D.

In making up the colored coating composition, the preferred procedure is to prepare a concentrate by milling together the pigment and sufficient of the castor oil resin mixture to provide about a 20% by weight concentration of the pigment, relative to the solids content. In calculating the percentage of pigment, the solids content of the castor oil and resin mixture is equal to the weight of castor oil plus one-half the weight of the "Beetle No. 227–8" (since the latter is half resin and half solvent). This concentrate is then blended for use with a sufficient further amount of the mixture of castor oil and "Rezyl No. 227–8" to bring the pigment percentage down to the desired value. For making a transparent colored spacing film as set forth in the foregoing description, the percentage of pigment will ordinarily be about 0.5–2.0%, the proportion being adjusted to give the desired color intensity. The ultimate color intensity depends on the thickness of the colored film or coating. Thus a coating or film made half as thick would need double the percentage of pigment to produce the same effect.

The transparent bead binder coating is next applied, and has the same composition as the above spacing film composition except that the pigment is omitted. A layer of No. 11 glass beads is embedded therein and the coating is then cured for one hour at 200° F.

The resultant "backless" colored reflex reflector sheet can be readily dry stripped from the carrier web and the latter can be reused. This colored reflector sheet is quite pliant and is highly waterpoof and proof against delamination, and is sufficiently stretchy to permit of ready conformation to the surfaces of embossed sign bases.

An alternative procedure is to cast the transparent colored spacing film directly on the coated carrier web (omitting the back sizing coating and reflector coating), followed by application of the binder coating and glass bead layer. The resultant colored transparent beaded sheet can be readily stripped from the carrier web and can be laminated to any desired base or sheet having a "silvery" metallic reflecting surface, to make a reflector sheet or sign. Thus it may be laminated to an aluminum foil or to a stiff sheet of aluminum, stainless steel or chromium-plated metal; or to a base or sheet which has been coated with an aluminum paint. The reflective base or sheet may first be painted or printed with a non-reflective coating in one or more areas to "black out" such portions, as for example to provide black lettering visible by contrast to the surrounding reflective background which will appear colored in the product. The beaded sheet can be readily laminated to foil by application of heat and pressure. It can also be readily laminated to the reflector surface by using a thin interposed transparent coating of liquid adhesive comprised of 100 parts "Beetle No. 227–8" and 50 parts of heavy blown castor oil, which is subsequently cured by heating.

The preformed transparent colored beaded film can also be coated, painted or printed on its back face with an aluminum flake reflector coating, or can be given a plating of silver, for example.

EXAMPLE 3

This example illustrates the making of a transparent stretchy beaded sheet which is uncolored and which can then be used in various ways in making reflectors and signs in accordance with this invention.

The same type of carrier web is employed as in the preceding Example 2, surfaced with a coating of isobutyl methacrylate polymer.

A transparent uncolored spacing film is cast directly on the carrier web, using a wet coating weight of approximately 20 grains per 24 sq. in. with the following formulation:

"Beetle No. 227-8" (50% solids) _____ 100
Heavy blown castor oil _____ 50

The film is cured for one hour at 200° F. A transparent uncolored bead binder coating is then applied, having the same composition, followed by application of No. 11 glass beads to form the bead layer, followed by curing at 200° F. for one hour. The resultant uncolored transparent beaded film is stripped from the carrier web. This may be employed as a stock sheet for making reflectors and signs of various types and colors, as indicated by the following illustrations.

One general procedure is to apply a thin transparent colored coating or coatings to the back face of the beaded sheet to provide the desired color effect; and then to laminate the sheet to a base sheet having a "silvery" metallic reflective surface, thereby producing a colored reflector or sign. The colored coating composition can be applied in any suitable way, by hand or machine. Thus it may be readily applied by using an offset printing press. By using multi-color offset printing methods, so that different color coatings are applied in different areas, it is possible to readily prepare multi-color signs in large numbers. Signs can also be made by using the silk-screen method for applying different color coatings to different areas to form the lettering, designs, symbols, backgrounds, etc., of contrasting color. Hand painting can be used where only a single sign, or a few signs, are to be made.

A second general procedure is to coat, print or paint the "silvery" metallic reflecting surface of a base or sheet (such as aluminum foil), using transparent colored coating compositions, to provide the desired color effect; and then to laminate the transparent beaded sheet to the surface, thereby producing a colored reflex reflecting reflector or sign.

In either case, the result is a laminated structure in which is embodied the principle of the present invention, since the layer of transparent spheres is spaced from an underlying "silvery" metallic reflecting surface and there is an interposed transparent film or stratum which is colored, so as to cause colored reflex reflection of outstanding brilliancy and liveness. The colored coating can be omitted from one or more areas so as to result in an uncolored transparent aperture overlying the reflective surface, in consequence of which a silvery appearance is produced in such places. An opaque non-reflective coating can be applied in one or more areas (such as black ink or paint) so as to "black out" such portions, as for example when it is desired to have some or all of the lettering of the sign appear black against a surrounding colored background. Hence it will be understood that the invention is not limited to signs in which the entire area has a transparent color film underlying the layer of spheres.

Suitable transparent colored coating compositions for use as described above, can be made by using the resin and castor oil blend previously described for use in making the beaded sheet. This resin and castor oil composition can be colored by grinding in 5 to 20% by weight of the desired colored transparent pigment. The viscosity can be reduced by thinning with a solvent, such as normal butyl Cellosolve (normal ethyleneglycol monobutylether), in order to increase the ease of applying, depending on the method employed. The concentration of pigment should be higher than in Example 2, so as to obtain the desired intensity of color in a coating relatively much thinner than the spacing film of the beaded sheet.

After printing, screen processing, painting or otherwise color coating the transparent beaded sheet, or the reflective base or sheet, depending on the type of procedure used, the beaded transparent sheet is laminated to the reflective base or sheet to provide the desired reflector or sign product. This can be done by simple hot pressing, due to the thermo-adhesive properties of the castor oil resin coating. The setting-up of the castor oil resin coatings can be combined in the same operation, being completed by the hot pressing laminating operation. If desired a thin interposed laminating adhesive can be applied, using the transparent castor oil resin composition (without color), followed by pressing to insure intimate contact of the lamina and heating to set-up the transparent adhesive coating. This results in a strong and waterproof bonding.

The following examples illustrate variations of the foregoing example wherein a preformed transparent spacing film is employed in making the transparent beaded sheet, which can then be coated on its back face with transparent color coatings, before lamination to the reflective base or sheet, or can be laminated directly to a reflective base or sheet which has been coated on its face with transparent color coatings.

EXAMPLE 4

A transparent film sheeting of rubber hydrochloride (such as "Pliofilm") is coated on one side with the necessary thickness of a bead binder composition comprised of 100 parts of heavy blown castor oil and 200 parts of "Beetle No. 227-8," the layer of glass beads is applied and the coating is cured by heating at 212° F. for 50-60 minutes. The application of this binder coat, as described, results in a final sheet which is even stretchier than the original "Pliofilm" sheeting. Colored coatings of the kind described in the preceding example can be employed in connection with the technique described. Due to the highly stretchy nature of this "Pliofilm" beaded sheet, it will generally be more convenient to color coat the reflective base or sheet and then laminate the beaded "Pliofilm" sheet thereto. The thermo-adhesive nature of the "Pliofilm" assists in making for strong bonding.

It is also possible to employ a transparent "Pliofilm" sheeting which is itself colored (by incorporation of a suitable dye or transparent pigment during its manufacture), resulting in a colored transparent beaded sheet which can be readily laminated to a reflective base or sheet to make a colored reflex reflector. The thermo-adhesive property of the "Pliofilm" permits of ready lamination by hot pressing.

Other examples of transparent stretchy films are films of polyvinylidene chloride ("Saran"), plasticized polyvinyl chloride ("Koroseal"), and plasticized polyvinyl butyral.

EXAMPLE 5

A web of cellulose acetate film is coated with a bead binder composition comprised of a mixture of:

"Rezyl No. 53" _____ 200
"Beetle No. 227-8" _____ 100

The "Rezyl No. 53" (made by American Cyanamid & Chemical Corp.) is a two-component liquid alkyd resin of the glycerine-phthalic anhydride type.

After application of the glass bead layer, the sheeting is oven heated for 30 hours at 165°–175° F. to dry and cure the binder coating.

The same alkyd resin binder composition may be used as a base in which suitable dyes or transparent pigments may be incorporated for providing transparent color coating compositions for use in making reflector or sign products in the ways previously indicated.

An alternative binder coating for use on the cellulose acetate web is a 40% solution in butyl alcohol of polyvinyl acetate (such as the AYAA, AYAF and AYAT types made by Carbide & Carbon Chemicals Co.). This type of binder coating does not require curing, but merely solvent removal following application of the glass beads, which may be accomplished by festooning the coated web racks and passing through an oven at 150° F. for 1 hour.

Adhesive back coatings

A wide variety of adhesives are suitable for coating on the back face of "backless" reflex reflector sheets, as herein described (as in Examples 1 and 2), to provide a sheet of the ready-to-lay type (such as is illustrated in Fig. 4, for example).

An example of a rubber-resin pressure-sensitive adhesive is one compounded of rubber and a tackifier, such as rosin or ester gum in lesser proportion than the rubber, and which may include a reinforcing pigment such as zinc oxide, being dissolved in heptane (volatile solvent) to provide a coatable viscosity. An adhesive of this type is described in R. G. Drew Patent No. 2,236,527, issued April 1, 1941.

A further example is a pressure-sensitive adhesive compounded of polyisobutylene ("Vistanex") and a lesser proportion of tackifier resin (such as hydrogenated indene resin), as described in H. J. Tierney Patent No. 2,319,959, issued May 25, 1943, which lists numerous suitable rubbery base and tackifier materials.

The adhesive solution may be coated on a Cellophane liner sheet, followed by drying to evaporate off the volatile solvent vehicle, and is then laminated to the back face of the reflector sheet, as by passing the two sheets between squeeze rolls with the tacky adhesive surface contacting the back face of the reflector sheet. The Cellophane liner may be left in place (as shown in Fig. 4), to be removed when desired by moistening and peeling off; or it may be removed following lamination and the reflector sheet may be wound directly in a roll without using a liner, subsequent unwinding being facilitated by the limited area of contact between the extremities of the beads and the contacting adhesive coating.

Pressure-sensitive adhesive coatings as described above, while tacky, are "eucohesive," by which it is meant that they are more cohesive than adhesive such that offsetting or transfer of adhesive material does not result when a sheet or tape coated therewith is unwound from rolls or removed from surfaces to which temporarily applied, and can be handled without transfer of adhesive material to the fingers. These adhesive coatings are waterproof, and are quite stretchy and hence suitable for use in making stretchy sheet material.

The following is an example of an adhesive coating solution which may be applied to provide (after evaporation of the solvent vehicle) a waterproof and stretchable adhesive coating which is both solvent-activatable and heat-activatable:

| | Parts |
|---|---|
| Rubber base | 102 |
|   45% reclaim rubber | |
|   45% zinc oxide — combined on rubber mill | |
|   10% latex crepe | |
| Rosin | 29 |
| "Nevillite Resin" of 150° C. melting point (hydrogenated indene-coumarone resin) | 21 |
| Oleum spirits (volatile petroleum hydrocarbon solvent of 306°–424° F. boiling range) | 80 |
| Ethyl alcohol (denatured with gasoline) | 1 |

The components are mixed in an internal mixer (such as "Mogul") until a homogeneous solution is obtained. The ethyl alcohol serves as a viscosity-reducer and may be omitted by using a larger proportion of the solvent.

The adhesive solution is coated upon the back surface of the beaded sheeting, as by use of a doctor blade, and the coated sheeting is then festooned upon racks and put through a drying oven to drive off the solvent. Six hours at 165° F. is a suitable combination for the drying step.

When the coated web is removed from the drying oven it is wound into rolls and at the same time a liner of regenerated cellulose film ("Cellophane") is wound in so as to contact the adhesive surface and be detachably adhered thereto, thereby covering the adhesive surface to prevent sticking of the adjacent beaded surface and to facilitate use of the sheeting.

Alternatively, the adhesive coating can be applied by a transfer method as has been described in connection with pressure-sensitive adhesive coatings. In this case the adhesive coated Cellophane liner is laminated to the back surface of the beaded reflector sheeting before the adhesive coating thereon has been fully dried (i. e. while still slightly tacky and warm), the trace of residual solvent being left in.

The Cellophane liner can be removed, after the sheet is cut to shape in making up signs, or whenever desired, by moistening with water and peeling off.

The adhesive coating may be activated to a tacky surface condition by moistening with V. M. P. naphtha, heptane or gasoline, etc. The sheet is then applied to the sign base and is held by the tacky adhesive during setting of the adhesive as the result of solvent evaporation. Or the reflctor sheet may be applied directly to the base and activated by heating with an iron or by placing in an oven (at say 225° F. for five minutes), followed by rolling to produce firm contacting.

Having described various embodiments of my invention, for purposes of illustration rather than limitation, what I claim is as follows:

1. A colored reflex light reflector comprising a light-returning layer of small uncolored transparent spheres held in position by a binder, an underlying reflector having a silvery metallic reflective surface spaced from the inner extremities of said spheres, and an interposed transparent spacing layer at least part of which constitutes a colored transparent stratum serving as a light filter between the layer of spheres and the reflective surface.

2. A colored reflex light reflector according to claim 1, wherein the reflector is a metal film having a silvery reflective surface.

3. A colored reflex light reflector according to claim 1, wherein the reflector is a stiff metal sheet having a silvery reflective surface.

4. A colored reflex light reflector according to claim 1, wherein the reflector is a film containing aluminum flakes lying approximately flat at the surface and providing a silvery semi-specular reflective surface.

5. A colored reflex light reflector comprising a reflector having a silvery metallic reflective surface, an overlying colored transparent spacing film, a light-returning layer of small uncolored transparent spheres overlying said spacing film and a binder coating holding said spheres in fixed position.

6. A colored reflex light reflector according to claim 5, wherein the colored transparent spacing film contains transparent color pigment particles.

7. A colored reflex light reflector comprising a reflector having a silvery metallic reflective surface, a thin transparent colored coating bonded to said reflective surface, an overlying uncolored transparent spacing film bonded to said colored coating, and an overlying light-returning layer of small uncolored transparent spheres bonded to said spacing film.

8. In combination with a silvery metallic reflective surface and laminated thereto, a self-sustaining preformed uncolored transparent flexible beaded sheet for producing reflex reflection, having a flat back surface and a light-returning layer of small transparent spheres spaced therefrom, and a thin transparent colored coating interposed between said back surface of the beaded sheet and said reflective surface.

9. A flexible colored reflex light reflector sheet adapted to be made in roll form and to be readily cut into pieces in making markers and signs, comprosing a flexible reflector sheet having a silvery metallic reflective surface, an overlying flexible transparent spacing layer at least part of which constitutes a colored transparent stratum, and an overlying light-returning layer of small glass spheres bonded to said spacing layer.

10. A flexible "backless" colored reflex reflector sheet comprising a self-sustaining flexible transparent film sheet having a light-returning layer of small uncolored transparent spheres embedded in the front side and spaced from the back side, and a flexible reflector film pigmented with aluminum flakes bonded to the back side of said transparent sheet, there being no permanent or integral backing underlying the reflector film, and said transparent film including a transparent colored stratum constituting a color filter between the layer of spheres and the reflector film; the product constituting a thin and pliable, unitary, colored reflex reflector sheet adapted to be readily cut and to be readily attached to base surfaces in making markers and signs.

11. A "backless" colored reflex reflector sheet according to claim 10, further characterized by being stretchy to the extent of at least about 20% as herein described.

PHILIP V. PALMQUIST.